INVENTOR
LEONARD D. BOYCE
AND  GEORGE R. ERICSON
BY
*George R Ericson*
ATTORNEY

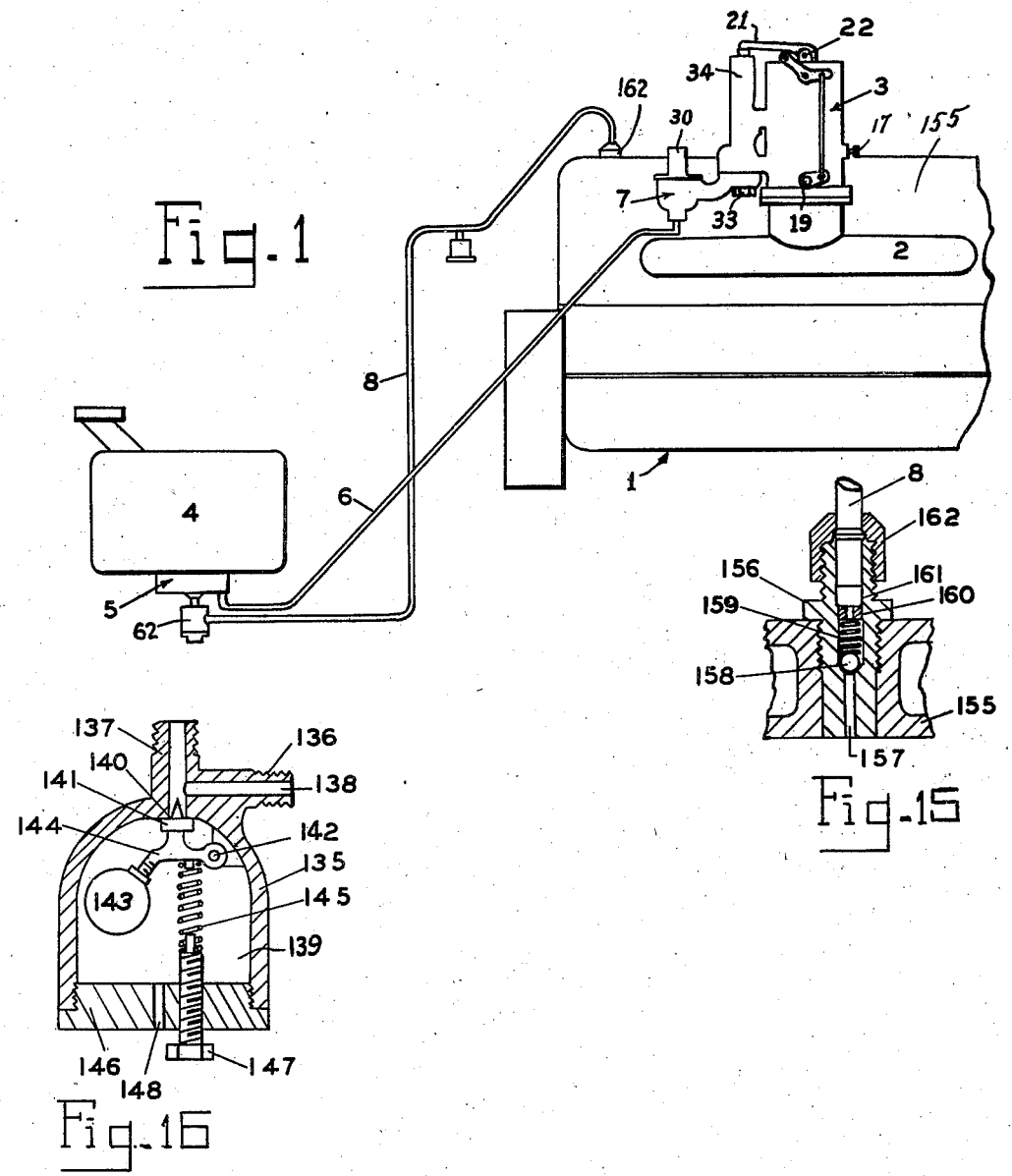
Nov. 3, 1936.  G. R. ERICSON ET AL  2,059,325
FUEL SUPPLY SYSTEM FOR INTERNAL COMBUSTION ENGINES
Filed June 20, 1930.  5 Sheets-Sheet 1
INVENTORS
LEONARD D. BOYCE
AND GEORGE R. ERICSON
BY
ATTORNEY Nov. 3, 1936.                G. R. ERICSON ET AL                2,059,325
             FUEL SUPPLY SYSTEM FOR INTERNAL COMBUSTION ENGINES
                     Filed June 20, 1930            5 Sheets-Sheet 2
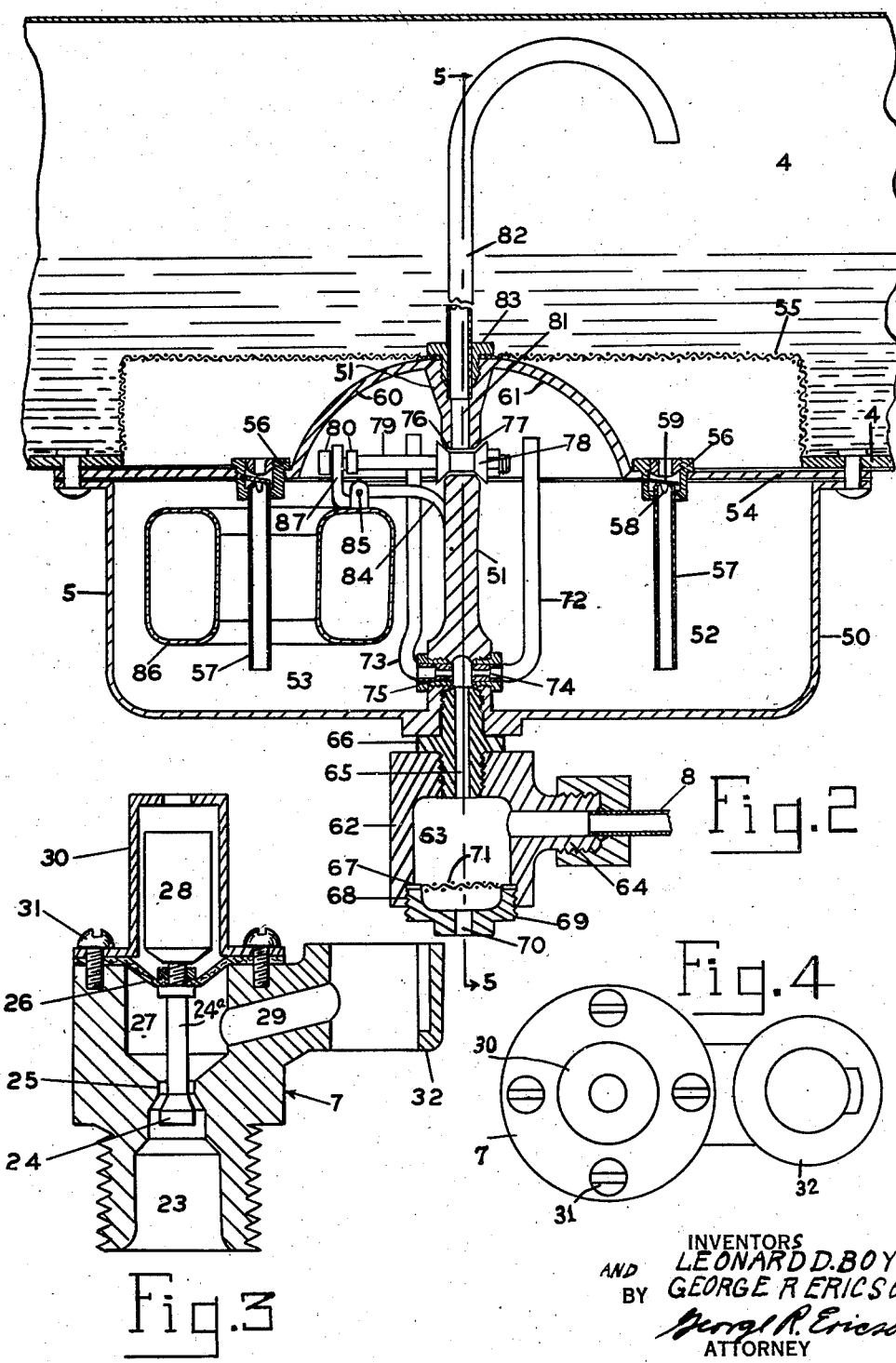
INVENTORS
LEONARD D. BOYCE
AND
BY GEORGE R ERICSON
ATTORNEY Nov. 3, 1936. G. R. ERICSON ET AL 2,059,325
FUEL SUPPLY SYSTEM FOR INTERNAL COMBUSTION ENGINES
Filed June 20, 1930 5 Sheets-Sheet 3
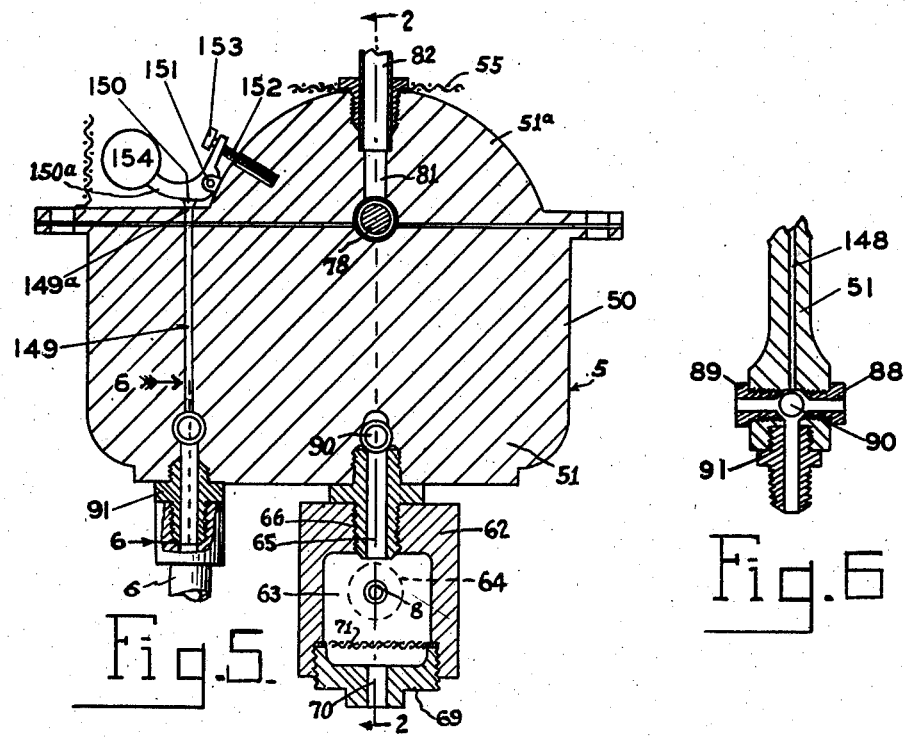
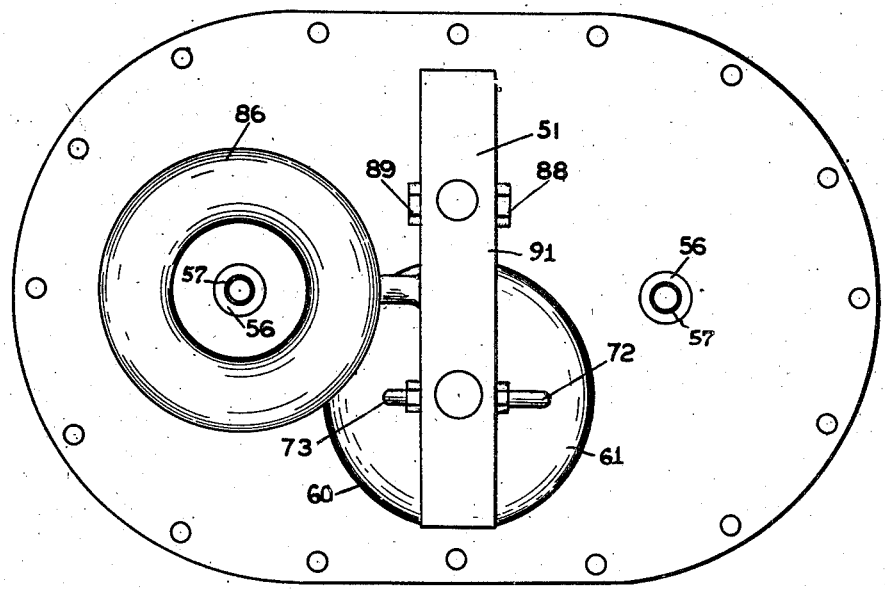
INVENTOR
LEONARD D. BOYCE
AND GEORGE R. ERICSON
BY
*George R. Ericson*
ATTORNEY Nov. 3, 1936.   G. R. ERICSON ET AL   2,059,325
FUEL SUPPLY SYSTEM FOR INTERNAL COMBUSTION ENGINES
Filed June 20, 1930   5 Sheets-Sheet 4
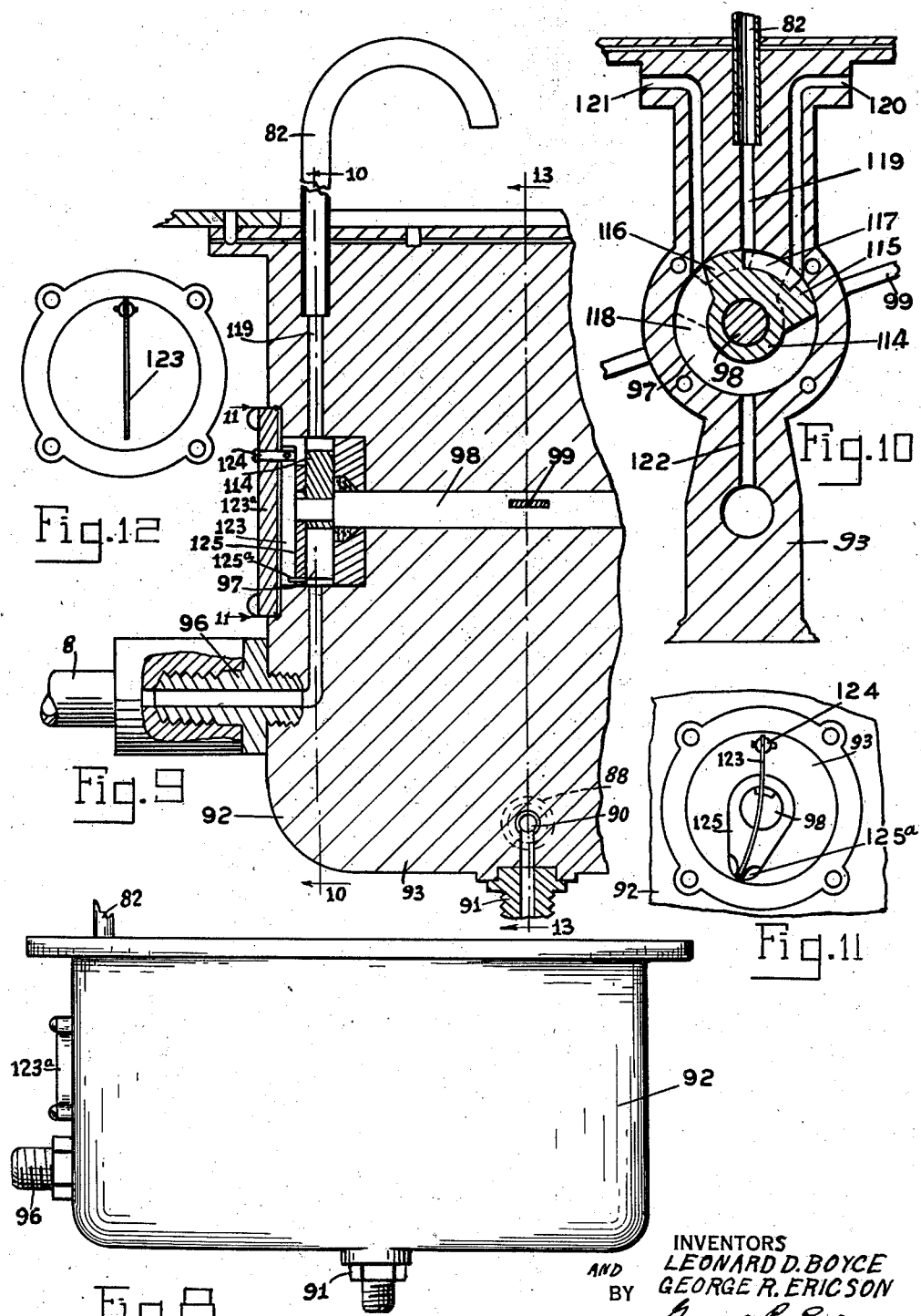
INVENTORS
LEONARD D. BOYCE
AND
GEORGE R. ERICSON
BY
*George R. Ericson*
ATTORNEY Nov. 3, 1936.   G. R. ERICSON ET AL   2,059,325
FUEL SUPPLY SYSTEM FOR INTERNAL COMBUSTION ENGINES
Filed June 20, 1930    5 Sheets-Sheet 5

Patented Nov. 3, 1936

2,059,325

UNITED STATES PATENT OFFICE 2,059,325

FUEL SUPPLY SYSTEM FOR INTERNAL COMBUSTION ENGINES

George R. Ericson and Leonard D. Boyce, Maplewood, Mo., assignors to Carter Carburetor Corporation, St. Louis, Mo., a corporation of Delaware Application June 20, 1930, Serial No. 462,669

4 Claims. (Cl. 158—36.5)

This invention relates to a fuel supply system for internal combustion engines, and particularly for internal combustion engines for gasoline automobiles or the like.

It is an object of the invention to provide a new and improved supply means for supplying a vaporized mixture of fuel and air to an internal combustion engine.

It is a further object of the invention to provide a new and improved fuel pumping device for supplying fuel from the supply tank of an internal combustion engine to the carburetor.

It is a further object of the invention to provide a new and improved carburetor for internal combustion engines.

It is a further object of the invention to provide a new and improved pressure regulating device for fuel supply systems.

It is a further object of the invention to provide a generally new and improved system for supplying, mixing, and vaporizing fuel for internal combustion engines.

The invention will be better understood upon reference to the accompanying drawings, in which:

Figure 1 is a diagrammatic representation of an installation made according to one form of our invention.

Figure 2 is a section on line 2—2 of Figure 5 showing a form of fuel pumping device according to one embodiment of our invention.

Figure 3 is a sectional view showing a form of pressure regulating valve according to one embodiment of our invention.

Figure 4 is a plan view of the parts shown in Figure 3.

Figure 5 is a section taken along the line 5—5 of Figure 2.

Figure 6 is a fragmentary view taken along the line 6—6 of Figure 5 showing the fuel outlet valve of the pumping mechanism shown in Figures 2 and 5.

Figure 7 is an upside down view of parts of the pumping device shown in Figures 2 and 5.

Figure 8 is an end elevation of a modified form of fuel pumping device.

Figure 9 is a fragmentary sectional view showing the valve mechanism of the pumping device shown in Figure 8.

Figure 10 is a vertical section taken on line 10—10 of Figure 9.

Figure 11 is a detail view taken substantially along line 11—11 of Figure 9.

Figure 12 is a disassembled view of the spring over-throw mechanism used in connection with the valve shown in Figures 9, 10, and 11.

Figure 15 shows a sectional elevation of the gas connector to the engine cylinder.

Figure 16 shows a modified form of moisture escape device.

Figure 13:
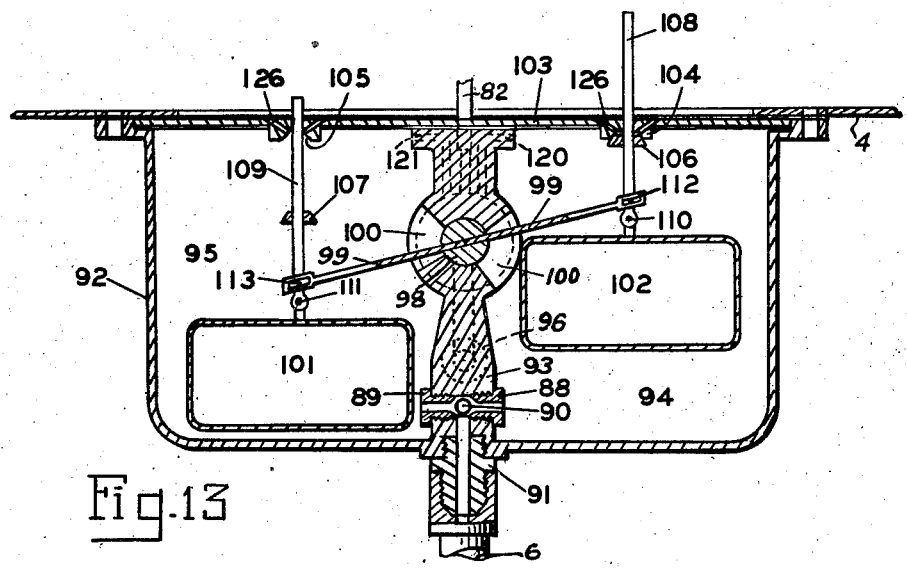
Figure 13 is a diagrammatic sectional view of the pumping device shown in Figures 8 and 9.

The reference numeral 1 (Fig. 1) indicates an internal combustion engine of the usual automotive type having an intake manifold 2 to which is attached the carburetor indicated generally at 3. A fuel supply tank 4 is mounted at the rear of the automobile and slightly lower than the engine, as indicated. This is the conventional location of the fuel tank, but it will be understood that certain features of the invention are equally applicable where the fuel tank is located at any relative height with respect to the engine. The fuel pumping device generally indicated at 5 is mounted preferably on the bottom of the fuel tank to receive fuel therefrom by gravity, and the fuel is pumped through the outlet line 6 from the pump to the pressure regulating device 7 adjacent the carburetor. The fluid pressure for operating the pump is supplied, preferably, from the cylinder of the engine through a conduit 8, as indicated.

The carburetor comprises a body member 9 having a flange 10 which is secured by means of bolts, or otherwise, to the intake manifold 2 of the engine. A downwardly extending air passageway 11 extends from the inlet end of the carburetor downwardly to a venturi 12 and through the venturi to a discharge outlet 13. An annular groove 14 is formed in the outer surface of the venturi so as to form with the body of the carburetor an annular fuel chamber. One or more passageways 15 are formed in the venturi to connect this annular chamber with the throat of the venturi as indicated. Suitable grooves or depressions 16 are formed in the venturi to receive screw 17 which retains the venturi in its position.

The carburetor is provided with a throttle 18 mounted on a shaft 19 which is controlled by the operator by means of conventional mechanism (not shown). A cam 20 rigid with the throttle shaft is mounted on the pivot 22 and functions with mechanism in a housing 34, which mechanism does not in itself, constitute a part of the present invention, to meter fuel entering the carburetor according to the position of the throttle.

The carburetor details, in themselves do not constitute the present invention and any suitable carburetor may be used. Where the carburetor is provided with a constant level chamber and float operated valve, this mechanism constitutes a secondary pressure control means in addition to the pressure control means 7.

The fuel is supplied under pressure to the inlet 23 of the pressure control mechanism 7. This pressure control mechanism (see Fig. 3) is provided with a valve 24 cooperating with the wall of restriction 25 to cut off the pressure and cut off the flow of fuel to the carburetor. The valve 24 is suitably connected by a stem 24a to a flexible diaphragm 26 which is mounted on the open end of the chamber 27 in the pressure control device. A spring or a weight 28 is provided to normally hold the diaphragm in the depressed position shown in Figure 3, in which position the valve 24 is open to its greatest extent, permitting a substantially free flow of gasoline through the device and through the outlet 29 to the carburetor. A cap or spring housing 30 holds the diaphragm in place, and the housing is, in turn, held by suitable screws 31. It will be obvious that the position of the diaphragm and of the valve 24 will vary in accordance with the pressure in the chamber 27. The passageway 29 terminates in a fitting 32 which is attached to the fuel regulating device by means of a bolt 33.

The fuel is supplied from the main tank 4 and according to the embodiment of the invention shown in Figures 2, 5, 6 and 7, the fuel supply device 5 comprises a casing 50 divided by a partition 51, shown as integral therewith, into a pair of wells 52 and 53. Attached to the casing 50 is a cover 54 having integral therewith a partition 51a forming a continuation of partition 51a. Screen 55 is mounted on the cover. The whole device is then attached to the bottom of the fuel tank 4, as shown in Figure 2. A pair of check valve members 56 are mounted in the cover 54. These check valve members open downwardly into tubes 57 which discharge into the lower portions of the wells 52 and 53. Grooves or notches 58 are provided in the upper ends of the tubes 57, which support check valve disks 59 to permit the flow of the fuel from the tank through the tubes 57 when the check valves are open. Air domes 60 and 61 are formed in cover 54.

Fluid under pressure, preferably air or gas from the combustion chamber of the engine, is supplied to the fuel pump through the conduit 8. It will be understood that the gas in the combustion chamber may contain some water which will condense by the time the gas is cooled off by passing through the conduit 8 to the back of the automobile. To take care of this moisture, we provide a separator device (Figs. 2 and 5) comprising a body member 62 attached to the bottom of pumping device 5 and having a chamber 63 therein. The conduit 8 is connected to body 62 by means of a threaded nipple 64 and threaded nipple 66 having a passage 65 connects body member 62 with the casing 50 of the pump. The lower portion of chamber 63 has internal threads 68 and a shoulder 67 and is closed by a threaded plug 69 having an opening 70. A piece of heavy cloth 71 is held against the shoulder 67 by the plug 69. The texture of this cloth is such that small quantities of water may pass through it slowly, but when wet with water, the passage of air or other gases through the cloth is comparatively difficult. A suitable cloth for this purpose is what is known as water-proof duck, but other very closely woven and dense (but not necessarily thick) materials will serve the same purpose. We also contemplate using a plurality of separated disks of cloth for the same purpose, the cloths being mounted in a stack and tightly held between suitable separating members.

A pair of upwardly extending tubes 72 and 73 are mounted in the partition 51 to receive air or gas under pressure from the passage 65 and conduit 8. These tubes communicate with passage 65 through restricted orifices 74 and 75 and extend up in the air domes 60 and 61 and discharge above the level of the fuel in the wells 52 and 53.

It will be understood that while a specific embodiment of fluid or gas supply means is hereinafter described for supplying air or gas under pressure through the conduit 8, any suitable means, for instance, an air pump, could be used for that purpose. The essential point is to have some means for supplying gas or other suitable fluid under substantial pressure, so as to maintain a constant flow of gas into the chambers 52 and 53. Discharge ports 76 and 77 are provided in partition 51a and these ports communicate with a passage 81 in partition 51a and with a curved tube 82. These ports are controlled by a double valve 78 which is mounted on a stem 79 extending into the dome 60 and having a pair of spaced shoulders 80 for operation by a means hereinafter described.

A discharge conduit 81 (Fig. 2) is formed in the partitions 51 and 51a and a bent tube 82 is connected to the outlet of this conduit by any suitable means such as the nut 83. The upper end of the tube, preferably, is turned over, as shown, to discharge downwardly and preferably the tube is made of such small diameter that fuel and air will not pass simultaneously therethrough.

A bracket 84 is mounted on the partition 51 and provided with a pivot or pintle 85 on which float 86 is mounted. The float has connected thereto a fork 87 which straddles the rod 79 between the shoulders 80. With the float mechanism as indicated, one portion of double valve 78 is closed against the seat 77 when the float 86 is down, and the other portion of the valve 78 is closed against the seat 76 when the float 86 is up. It will, of course, be understood that the double valve 78 is long enough between the valve portions to permit a substantially free passage of fluid through either one of the valve seats 76 and 77 when the other is closed.

Referring to Figures 5 and 6, the partition 51 is provided with a pair of valve seat members 88 and 89 communicating with passage 149, which members loosely enclose a ball valve 90. A preponderance of pressure in either direction will cause the ball valve 90 to seat against the opposite valve seat member, but permitting fluid to pass readily from one of the chambers 52 or 53 to the nipple 91 connected to the conduit 6.

The passage 149 is connected by a nipple 91 to fuel supply conduit 6 of the carburetor and communicates with the main fuel tank through an orifice 149a. A valve 150 carried by arm 150a controls the orifice 149a, the valve arm being pivoted at 151 to the cover member 54 of the pumping device. A spring 152, adjustable by a screw 153, partially controls the pressure on the valve 150. A weight 154 mounted on the valve at the rear and slightly above the pivot 151 assists the spring 152 in holding the valve in closed position.

The valve 50 and associated elements act as a pressure controlling device, which, in turn is controlled by the spring 152 and weight 154. Inclination of the pumping device due, for instance, to location of the associated automobile on a hill obviously varies the effective pressure applied to valve 150 by weight arm 150a and tending to close the valve.

In Figure 15 is illustrated the engine cylinder connection which comprises one form of pressure obtaining means for this device. The reference numeral 155 indicates the cylinder head of the internal combustion engine. A nipple 156 is screw threaded into the head of the cylinder as shown and is provided with a bore 157 opening into the engine combustion chamber.

A ball check valve 158 normally held in closed position by a spring 159, readily permits the discharge of gas from the cylinder, but prevents its return thereto. A collar 160 pressed into the counter bore 161 holds the spring in position. A conventional pipe connection 162 is used to secure the end of the conduit 8 to the nipple 156.

In Figure 16 I have shown a combined pressure relief valve and water separating device comprising a body member 135, a threaded inlet nipple 136 for connecting the device to the pressure conduit 8 and a second nipple 137 for attachment to the pressure connection 6 of the pumping device. Communicating passageways 138 and 138a extend through the nipples 137 and 138 and passageway 138a opens into a chamber 139 containing the valve mechanism.

A seat 140 at the inner end of passageway 138a is controlled by a valve 141 pivoted to the body member at 142. An adjustable weight 143 is attached to valve arm 144 connecting the valve with the pivot 142 and the weight 143, which arm 144 is mounted so that the pivot is toward the front and the weight towards the rear end of the car. The weight is located at a point lower than the pivot.

The lower end of the body member 135 is closed by a plug 146. An adjusting screw 147 is provided in the plug, and a vent 148 is formed either in the plug, as shown or in the chamber body member to permit the escape of water from the conduit 8 and to reduce excess pressures.

The operation of this feature of the device is as follows: Pressure exceeding a predetermined amount in the conduit 8 and passageway 138, assisted by the weight 143, will cause the valve 141 to open against the pressure of the spring 145, thereby preventing liquid being discharged from the pump at a pressure in excess of a predetermined maximum in accordance with the needs of the particular automobile to which the device is attached.

The engine to which the fuel is supplied being considerably ahead of the fuel pump in the usual automobile installation, the mere maintenance of a predetermined pressure at the fuel pump is not entirely satisfactory, for if the car is going uphill or is accelerating, the effective pressure of the fuel at the carburetor is decreased by the tendency to flow back through the pipe line toward the fuel pump due to gravity or inertia or both.

This defect is overcome with the above described apparatus for the reason that the effective length of the weight arm 144 changes with the angular position of the car. When the car is going uphill, the center of gravity of weight 143 is closer to a vertical line through the pivot 142, that is, the leverage arm of the weight is shorter, than when the car is going downhill or on the level. The effective force applied by the weight tending to open valve 141 and compress spring 145, accordingly, is reduced at such time permitting a higher pressure to be delivered through the conduit 8, and the resulting higher pressure of the fuel discharged from the pump. When the automobile is descending a hill, the opposite takes place and the pressure of the fuel is decreased.

Another function of the weight 143 is to vibrate slightly when the car passes over bumps in the road, thereby preventing the formation of ice at the valve seats, or at least breaking it as fast as it forms. It will be understood that there may be some water condensed out of the gases supplied from the engine cylinder through conduit 8, and it would be undesirable to permit this to collect at the valve, for it might freeze and cause the valve to seal against higher pressures than are desired in the conduit 138. The orifice 148 provides for draining off condensed moisture which collects in chamber 139.

It will be understood that the pressure control device 7 is capable of being used in addition to a pressure control as shown at 150 in Figure 5 and either or both of these may be used in connection with or in the absence of the special control device shown in Figure 16. Certain types of installations may require different types of pressure control devices, and while these are equivalents in a certain sense, it is contemplated that all these devices might be used in a single installation.

Figure 14:
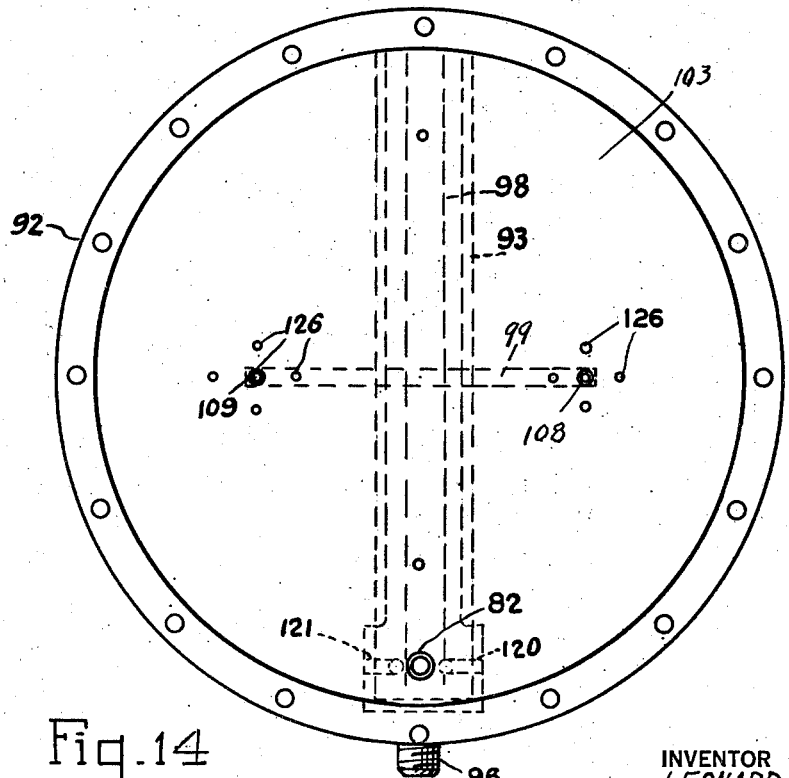
Figure 14 is a plan view of the pumping device shown in Figures 8 and 13.

Referring to the embodiment of the fuel pumping devices shown in Figures 8 to 14, there is shown a casing 92 divided by a partition 93 to form two chambers 94 and 95. Air or gas under pressure is supplied through the conduit 8 (Fig. 1) to the nipple 96 and the valve chamber 97 formed in the partition 93. A valve stem 98 is rotatably mounted in the partition, and an operating rod 99 extends through slots 100 in the partition, and through the valve stem 98. Floats 101 and 102 are mounted in the chambers 95 and 94. The casing 92 is provided with a cover 103, and valve seat members 104 and 105 are formed in the cover to cooperate with the valves 106 and 107. These valves are mounted on stems 108 and 109 which are pivoted at 110 and 111 to the floats. The operating rod 99 is also pivoted by pin and slot connections as at 112 and 113 to the stems 108 and 109.

A valve 114 is fixedly mounted on the end of the valve stem 98 and provided with two radially extending parts 115 and 116 (Fig. 10) which separate the ports 117 and 118. The port 117 selectively connects the discharge outlet 119 with the passages 120 and 121; that is, the port 117 always also communicates with the outlet 119, and it communicates in one position with the passage 120 as shown in Figure 10 in solid lines to the exclusion of passage 121, while, in the other position as shown in dotted lines in Figure 10, it communicates with the passage 121 to the exclusion of passage 120. The port 118 always communicates with the inlet passage 122 and selectively communicates with the passages 120 and 121.

A spring 123 is pivoted at 124 to a member 123a forming a cover for chamber 123 in partition 93 and to a projection 125 on valve 114 as at 125a, the spring being a little longer than the distance between the pivots, so as to give the device what is known in the art as a spring overthrow motion and causing it to assume normally one or the other of its bent positions as in Fig. 12 with valve port 117 connecting passage 119 with one or the other of the passages 120 and 121.

Suitable perforations 126 are formed in the cover 103 to permit gasoline to flow into the chambers 94 and 95. It will be understood that these openings 126 are controlled by the valves 106 and 107. The outlet passageways and check valve, namely parts 88 to 91, are of the same construction as described in connection with Figure 8, and no further description of these is considered necessary.

The operation of the device shown in Figures 1 to 7 is as follows:

The gas compressed in the cylinder of the engine passes through the conduit 8. The amount of gas thus escaping is, of course, very small in comparison to the total volume of gas in the cylinder. An outwardly opening check valve and suitable flow restricting means are provided at 158 and 157 (Fig. 15) to prevent the return flow of gas into the cylinder. The water trap 62 shown in Figures 2 and 5 catch any condensation in the line 8 and discharge it to the atmosphere, while maintaining a substantial pressure in the conduit 8 and the chamber 63. A slow constant flow of gas passes the restricting orifices 74 and 75 and flows through pipes 72 and 73 up into the domes 60 and 61. If the float 86 is in its lowermost position, the valve seat 76 will be open and dome 60 exposed to atmospheric pressure in the main fuel tank through conduits 81 and 82. Fuel from the gasoline tank 4 will open the check valve member 56 to the left of Figure 2 by gravity, and fuel will flow downwardly through the corresponding tube 57 to fill the well 53. As soon as the well 53 is substantially filled, the buoyancy of the float 86 will lift the float and move the stem 79 toward the right of Figure 2 and close the valve seat 76 while opening the valve seat 77.

The gases under pressure will then escape from the well 52, and the flow of the gas through the orifice 75 will then build up a pressure in the well 53 closing check valve member 56 in the left of Figure 2, and moving check valve 90 to the right in Figure 6 to closing against the seat member 88 and permitting fuel to be discharged from the lower portion of the well 53 through seat member 89. This fuel will then flow through the conduit 6 and the pressure control device 7 to the carburetor. It will be understood that the pressure which is built up in the well 53 and the dome 60 will assist in maintaining the valve 78 in position to close the seat 76, but, as the fuel level approaches the bottom of the float 86, the weight of the float will finally pull the valve 78 away from the seat 76, permitting the escape of gas from the dome 60 and the well 53.

During the time the fuel was being discharged under pressure from the well 53, the valve seat 77 was open and the constant flow of gas through the restricted orifice 74 and the tube 72 was permitted to flow out unobstructed through the exhaust conduit 82 and into the gasoline tank from which the pressure would escape through the usual air leak provided in such tanks. The disk 59 of the check valve member 56 in chamber 52 being open and permitting the flow of fuel thereinto from the tank. This well 52 is substantially full of fuel by the time the fuel is discharged from the well 53 and upon the closure of the valve 78 on seat 77, pressure immediately begins to build up in the well 52, causing the discharge of fuel through seat member 88 and conduit 6 from that well to the pressure control devices. The highly restricted passages 74 and 75 communicating by means of tubes 72 and 73 with the domes 61 and 60 and also with the separator chamber 63 and with the atmosphere thru the opening 70, form a highly restricted constant communication between the atmosphere and the chambers 52 and 53 so that when the operation of the device is stopped the pressure existing in either one of the chambers 52 or 53 is relieved in a comparatively short time, thereby preventing possible difficulties by reason of a leak at the float valve at the carburetor.

When there is no pressure in the chamber 27 of the pressure control device, the valve 24 remains in full open position as shown in Figure 3, but as the pressure is built up in the chamber 27, the valve 24 is partially closed, thereby regulating the pressure to a substantially constant head. The valve 24 fits loosely in the orifice 25, so that this opening is never entirely closed; otherwise, the pressure on the head of the valve 24 might build up to such an extent that the diaphragm would not readily respond to the variations in the pressure chamber 27. This is of small importance, however, for the diameter of the valve 24 in proportion to the diameter of the diaphragm may be made so comparatively small that the pressure head developed would never be sufficient to hold it closed when there is substantially no pressure in the chamber 27.

Fuel being supplied to the outlet 29 of the pressure control device at a substantially constant head, a substantially constant flow of fuel into the carburetor will result, and this fuel will be discharged at the throat of the venturi 12 through the orifices 15.

The amount of fuel flowing into the carburetor will be dependent on the pressure head maintained by the pressure control device 7, and also on the suction produced by the air drawn into the engine. The pressure head, due to the control of the device 7, supplies a constant amount of fuel per unit of time for each position of the throttle. This constant amount of fuel is added to in proportion to the suction of the engine, so that a properly calibrated fuel supply is maintained for all conditions of constant flow.

Obviously the invention is not limited to the exact details of the various forms shown and these may be modified in various respects as will occur to those skilled in the art. I have shown a complete operative fuel supply system, but one or more of the control devices and other features may be omitted if desired. The exclusive use is contemplated of all such modifications as come within the scope of the appended claims.

We claim:

1. In a fuel supply system for automotive internal combustion engines, a main fuel tank, a source of gas under pressure, a pair of fuel wells adapted to receive fuel from the main fuel tank, a vent for said fuel wells, a float in one of said wells, a float operated valve for controlling one of said vents, means for conducting fuel from said wells to the engine, and means for controlling the pressure of fuel supplied to said engine in accordance with temporary variations in the relative heights of the main tank and the engine.

2. In a device of the class described, an automotive installation comprising a carburetor mounted near the front end of the automobile, a fuel supply tank mounted near the rear end of the automobile, a fuel pump at said fuel tank for supplying fuel to the carburetor, and means responsive to the tilting of the vehicle in travelling uphill or downhill for varying the pressure supplied by the pump, said means maintaining a substantially constant pressure at said carburetor.

3. In a vehicle, an internal combustion engine, a fuel tank, a pump for supplying fuel from said tank to said engine, a pressure control means for said pump, and means operated by tilting of the vehicle for varying the operating condition of said pressure control means.

4. In a motor vehicle, a carburetor, a fuel supply tank, a pump for delivering fuel from said tank to said carburetor, a release valve for said pump, a spring normally holding said release valve in closed position and an eccentrically pivoted weight connected to said valve to vary the pressure at which said valve opens.

GEORGE R. ERICSON.
LEONARD D. BOYCE.